United States Patent Office 3,403,747
Patented Oct. 1, 1968

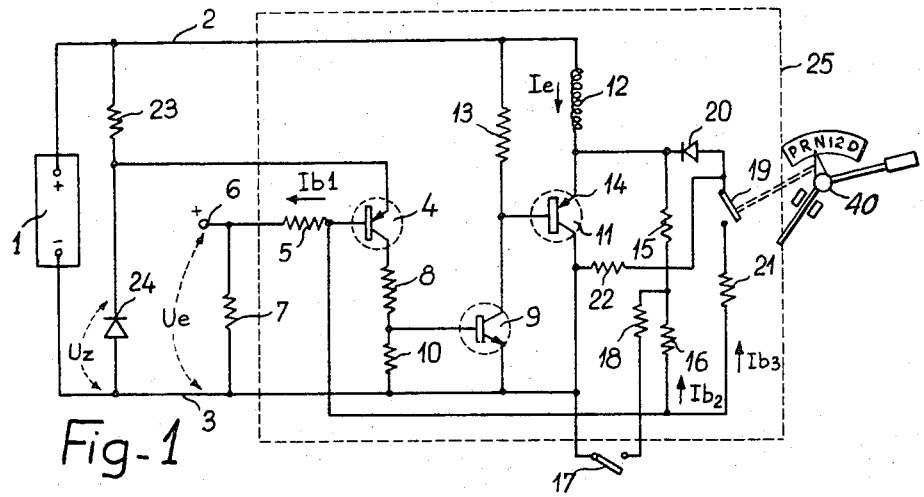
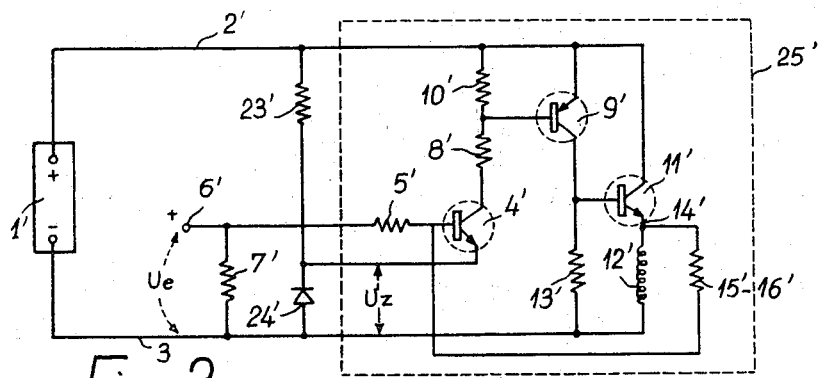
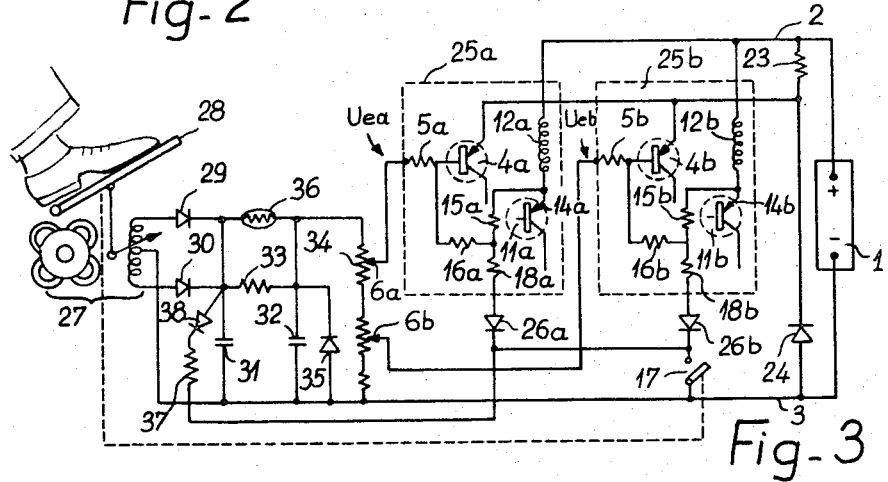

3,403,747
AUTOMATIC TRANSMISSION CONTROL CIRCUIT
Gaëtan de Coye de Castelet, Billancourt, France, assignor to Regie Nationale des Usines Renault, Billancourt, France
Filed May 6, 1966, Ser. No. 548,300
Claims priority, application France, May 13, 1965, 16,998
8 Claims. (Cl. 180—105)

ABSTRACT OF THE DISCLOSURE

A control device for controlling gear changes in an automatic transmission in response to wheel speed and having three complementary transistors, the first and third being of one polarity and the second being of the opposite polarity. Power is supplied to the circuit from a source having an output proportional to wheel speed and responsive to the position of the accelerator. The device substantially eliminates movable contacts while permitting great adaptability in selecting speeds at which control is to take place.

---

The present invention relates to a live-circuit control-device designed notably for controlling gear changes in automatic transmission systems of automotive vehicles. It is current practice in this case to use a tachometric member operatively connected to a rotary shaft of the transmission and engine output in order to control the engagement of the various speeds as a function of the speed of rotation of the tachometric member and also of one or more auxiliary parameters of which at least one corresponds to the engine load and may be represented for example by the position of the accelerator pedal.

It is the object of the present invention to provide a live-circuit control device free of any movable and notably sliding contact except for auxiliary purposes, this device being adapted to directly control a relatively powerful change-speed member characterized by a current consumption of the order of one ampere or more by using the minimum number of semiconductors, notably diodes, while leaving full liberty to the manufacturer for choosing the speed of rotation controlling the speed changes both upwards and downwards, this device receiving from an external tachometric generator a voltage proportional to the vehicle speed.

The device constituting the subject matter of the present invention is based on the property of transistors of existing in both polarities and is therefore referred to herein as a device with complementary transistors. It is only in recent times that such electric circuits have been made suitable for practical use due to the development of silicon transistors characterized by a low cost and a moderate dielectric current in the hot state.

In order to afford a clearer understanding of this invention, the same will now be described with reference to the specific application thereof to the control of gear changes in an automatic transmission system of an automotive vehicle, in conjunction with the accompanying drawing in which:

FIGURE 1 is a wiring diagram showing the electronic section of a device constructed according to the teachings of this invention and utilizing the following sequence of transistors: PNP, NPN, PNP. This device is adapted to supply energizing voltage to the member to be actuated at speed values below the preset value;

FIGURE 2 is another wiring diagram based on a NPN, PNP, NPN transistor sequence which, as contrasted with the diagram of FIGURE 1, delivers a control voltage to the member to be actuated at speed values higher than the preset value.

The diagram of FIGURES 1 and 2 are consistent with each other in that they can be used toether in a same system utilizing notably a common tachometric driving member, the return to the tachometric generator being taken at the same polarity of the current source.

FIGURE 3 is another wiring diagram of a device for controlling a three-speed transmission of which the intermediate and top gears are controlled automatically, the bottom gear (providing the highest gear ratio) being controlled manually in the usual manner. The transmission mechanism is of any known type, for example an epicyclic gear mechanism. It comprises two control sections similar to the one shown in dotted lines in FIGURE 1 (and shown at 25a and 25b in FIGURE 3).

Referring first to FIGURE 1, the storage battery 1 of the vehicle supplies voltage to the positive line 2 and negative line 3, connected to the circuit elements.

A Zener diode 24 and its series resistance 23 connected to circuit lines 2 and 3 respectively provide a reference voltage $U_z$ fed to the emitter electrode of a PNP transistor 4 having its base connected through a resistance 5 to the terminal 6 receiving the voltage $U_e$ to be compared with $U_z$ this $U_e$ voltage being delivered from a tachometric generator (not shown) revolving at a speed proportional to the rotational speed of the wheels of the vehicle of which the change-speed members are to be controlled automatically. A resistance 7 weaker than 5 provides the voltage of terminal 6 in relation to terminal 3. The collector electrode of transistor 4 is connected through a limiting resistance 8 to the base of an NPN transistor 9 having its emitter electrode connected to line 3, another resistance 10 providing the base voltage when transistor 4 is nonconducting. The collector electrode of transistor 9 is connected to the base of another PNP transistor 11 having its base leakage provided for by a resistance 13 connected to line 2.

The change-speed control member is shown in the form of a coil 12 of relatively low internal resistance which is inserted between the emitter electrode 14 of transistor 11 and line 2. Two series resistances 15 and 16 connect this emitter electrode 14 of transistor 11 to the base transistor 4. As a rule, the total value of resistances 15 and 16 is several times the value of resistance 5.

One fraction of the voltage at emitter electrode 14 is thus fed back to the base of transistor 4.

In addition, in parallel with the series-connected resistance 15 and 16, a circuit is provided which comprises a diode 20 conducting in the direction towards the emitter electrode 14, a switch 19 and a limiting resistance 21 of lower value than resistance 5; moreover, the input terminal of diode 20 is connected through a resistance 22 to the collector of transistor 11, between this transistor and line 3.

Finally, another switch 17 and a resistance 18 are inserted between line 3 and a point intermediate and resistances 15 and 16.

This circuit arrangement operates as follows:

Assuming the switches 17 and 19 are open, when voltage $U_e=0$, a current $I_{b1}$ from the base of PNP transistor 4 flows through resistance 5. This current causes the PNP transistor 4, NPN transistor 9 and PNP transistor 11 to become conducting, the potential of emitter electrode 14 approximating that of line 3. Under these conditions, a base current $I_{b2}$ flows through resistances 15 and 16, and is thus added to the first-named current, whereby coil 12 is fully energized.

As $U_e$ increases positively current $I_{b1}$ decreases. When the sum $I_{b1}+I_{b2}$ is not sufficient to make the transistor fully conducting, the emitter voltage of transistor 4 departs from the voltage value of line 3, $I_{b2}$ decreases, thus accelerating the process, a reversal takes place and the transistors are no more conducting, whereby coil 12 is deenergized.

By using transistors having a sufficient gain this reversal takes place when $U_e$ is very close to $U_z$ minus the base/emitter threshold voltage of transistor 4.

After this reversal the emitter voltage of transistor 11 is substantially the same as the voltage of line 2 and current $I_{b2}$ is reversed; however, it does not flow through the base of transistor 4.

It is not necessary to provide a diode connected in parallel to the coil 12 for protecting transistor 11, for when the break takes place the excess voltage fed to the terminals of coil 12 will cause a voltage to be fed through resistance 13 between the base and emitter electrode of transistor 11, which thus becomes conducting. In fact, as current $I_e$ preserves its direction of flow and coil 12 becomes generating, the emitter 14 is made positive in relation to the base, thus temporarily preserving current in transistor 11 even through transistor 9 is no more conducting.

Assuming now that voltage $U_e$ decreases, the re-reversal will take place at a predetermined value considerably lower than the preceding one, which is obtained by properly selecting the resistances 15, 16, 5 and 7, this effect resulting from the reversing of current $I_{b2}$.

The voltage value $U_e$ at which the reversal takes place, when $U_e$ drops to a value below a predetermined, so-called "preset" value, may be preset at a value closer to the value at which the reversal takes place for increasing values of $U_e$, by closing switch 17 controlling the circuit between line 3 and the resistance 18 having its opposite end connected to the junction point of resistances 15 and 16. Thus, for instance, the value of resistance 15 may be thirty times lower than that of resistance 16. Resistances 15 and 18 constitute a voltage divider substantially not affecting $I_{b2}$ and 11 is conducting but reducing the reverse current $I_{b2}$ when 11 is not conducting. At the limit, the voltage drop in resistance 18 having zero value, there is no more feedback and the points of reversal and re-reversal would merge into a narrow zone of operation as an amplifier.

To produce a braking effect when coasting, that is, by engaging the low speed providing the highest gear ratio, which change cannot take place unless the voltage $U_e$ (and therefore the speed of the tachometric member) drops below a predetermined value, without causing the possibility of this effect ceasing beyond the engagement speed, it is only necessary to close switch 19 connecting the emitter electrode 14 of transistor 11 to the base of transistor 4 through the diode 20 of which the direction of current flow is towards this emitter 14 and the limiting resistance 21 of a value lower than resistance 5. As long as coil 12 is not energized the circuit 19, 20 and 21 is inoperative. On the other hand, when coil 12 is re-energized, a high voltage $I_{b3}$ will flow through resistance 21, keep transistor 4 conducting and energize coil 12 even through the aforesaid $U_e$ voltage rose to $n$ times this preset value.

Resistance 22 connected through diode 20 to the emitter 14 and through switch 19 to resistance 21 is adapted, by acting as a voltage divider with resistances 5 and 21, to raise considerably the reversal point of decreasing voltage $U_e$ in the position corresponding to the use of the engine for braking purposes, with switch 19 closed.

This switch 19 may be connected to the change-speed lever 40 or to push-buttons for manually selecting the gear ratios to avoid engaging a very low-geared ratio when the engine speed is very high, while permitting of preserving this ratio as soon as the latter is engaged.

In the device thus described the increasing-voltage reversal voltage $U_e$ is perfectly stabilized by the Zener diode 24 limiting in the upward direction the useful voltage of the tachometric generator beyond the preset speeds, the decreasing-voltage re-reversal being on the other hand slightly responsive to the variations of the storage battery 1 as a consequence of the reverse current $I_{b2}$ when transistor 11 is not conducting.

The elements necessary for controlling the coil 12 which are not common in the case of a plurality of control plaths are enclosed in a dotted-line rectangular frame 25.

FIGURE 2 illustrates the wiring diagram, reduced to its essential elements, of a similar device utilizing the NPN, PNP and NPN transistor series with a view to avoid energizing the coil 12 when the aforesaid voltage $U_e$ is lower than the preset value. Below this value no current flows from the base through resistances 5', 15'-16' and transistors 4', 9', 11' are not conducting; however, resistances 5' and 15'-16' act as a voltage divider.

Beyond the threshold, transistor 4' becomes conducting and delivers voltage to transistors 9' and 11', and a current capable of reinforcing the base current of transistor 4' flows through resistances 15'-16', thus producing the reversal and the complete energization of coil 12'. The operation of the control circuit is otherwise substantially the same as in the case illustrated in FIGURE 1, except for the reversal of the energizing current to 12'. This figure illustrates only the component elements essential for the operation of the circuit, but the latter has the same possibilities as the circuit of FIGURE 1.

FIGURE 3 is the wiring diagram of a device according to this invention for controlling a three-speed vehicle transmission, the engagement of the intermediate and top speeds being controlled automatically during the operation of the vehicle by means of a tachometric alternator operatively connected to the wheels of the vehicle and of which the output voltage varying substantially linearly with the speed of the wheels is responsive to the position of the accelerator pedal. This tachometric generator may be considered as being already known per se, notably through the U.S. Patents No. 3,124,693 filed Mar. 10, 1964, No. 3,327,802, filed June 5, 1964, and No. 3,344,-294 filed Mar. 11, 1965.

The gearbox is also of a known type, notably of the epicyclic gearing type, the coils to be energized consisting for example of solenoid-operated valves. If desired, a switching system may be contemplated, for example for reversing the poles in an electrical transmission system. In FIGURE 3 the wiring diagram illustrated comprises two dotted-line frames 25a and 25b corresponding to the component elements illustrated in the dotted-line frame of FIGURE 1. The same reference symbols designate corresponding elements.

The storage battery 1 of the vehicle, the positive and negative circuit lines 2, 3, the Zener diode 24, its series resistance 23, the switch 17 causing the re-reversal to approach the reversal are common to both control sections 25a and 25b. Control section 25a controls the coil 12a to change from low gear to intermediate gear, and on the other hand section 25b controls the other coils 12b for changing from intermediate gear to top gear.

The tachometric generator 27 connected to the wheels of the vehicle delivers an alternating current depending on the speed of the vehicle and on the momentary position of accelerator pedal 28. Both alternations are rectified by diodes 29 and 30 interconnected through resistance 33. Across the terminals of capacitor 32 is a voltage divider 34 having two adjustable tappings 6a and 6b connected through input resistances 5a and 5b to circuit sections 25a and 25b, respectively. The voltages $U_{ea}$ and $U_{eb}$ of which the values control the gear changes are available at these tappings.

A Zener diode 35 limits the voltage which capacitor 32 can assume, and therefore also partially that of capacitor 31. This diode permits reducing the apparent time constant of the circuit in case of sudden voltage drop at the output of generator 27.

A resistance 36 having a negative temperature coefficient, which is connected in parallel to resistance 33, permits compensating the variations with temperature of the sensitivity of sections 25a and 25b.

The circuit switch 17 comprises in series with resistance 18a a diode 26a and, in series with resistance 18b, another diode 26b, both diodes preventing any interaction between the two circuits. The function of this switch is to revert to a more reduced gear-ratio between the change time of increasing speed and the change time of decreasing speed. As a rule, this contact is closed by the accelerator pedal as the latter completes its stroke, when the throttle is wide open, the mechanical linkage between the accelerator pedal 28 and the switch 17 being shown diagrammatically by a dotted line.

A resistance 37 and a diode 38 in series therewith interconnect the capacitor 31 and the closing contact stud of switch 17. When this switch is closed the time constant of the filter circuit is lower, but this material since switch 17 is closed only in well-defined circumstances when the engine revolves at relatively high speed, so that the down change thus produced will take place much faster. If as an alternate form of embodiment the circuit 37/38 were connected to capacitor 32 instead of capacitor 31, resistance 33 and 36 on the one hand, 37 on the other hand, would act as a voltage divider and thus produce both a reduction in the time constant and a general increment of the speed of change from one to another gear ratio.

It will be noted that in the case of a vehicle battery of which the negative terminal is connected to the frame of the vehicle, the greater part of the component elements disposed outside the electronic case have one end connected to this frame, thus facilitating the wiring work.

It will also be observed that any accidental grounding of emited electrodes 14a and 14b is not attended by the destruction of the transistors but merely the energization of coils 12a and 12b, and that it is not necessary to insulate the transistors 11a and 11b from the vehicle frame.

As an exemplary order of magnitude of the component elements of the system of this invention, the following values may be cited 5a=5b=10 kilohms, 16a=16b=68 kilohms, 15a=15b=18a=18b=2.2 kilohms, 12a=12b= 25 ohms, battery rated voltage 14 volts, Zener diode voltage 24=7.5 volts.

I claim:

1. A control device for controlling the gear changes in an automatic transmission according to wheel speed comprising a control voltage source, first, second and third complementary transistors, the first and third transistors being of one polarity and the second being of the opposite polarity, the collector of the first transistor being connected to the base of the third transistor, a member to be controlled being inserted in series with the emitter of the third transistor, a feedback resistance connecting said emitter of the third transistor to the base of the first transistor, resistor means connecting said base of the first transistor to said control voltage source the variations of which selectively produce zero and full energization of the member to be controlled, a regulated voltage inferior to the feed voltage of the other two transistors being connected to the emitter of said first transistor, said regulated voltage being thus compared with said control voltage fed to the base of the first transistor.

2. A control device according to claim 1 further comprising a tachometric generator operatively connected to the wheels of a vehicle and forming said control voltage source, the voltage output of said generator being proportional to the speed of the wheels and also to the position of the vehicle's accelerator in order to control the various transmissions ratios, voltage divider means delivering to each portion of said control circuit receiving that fraction of the control voltage necessary for its operation.

3. A control device according to claim 2 further comprising a nonlinear element having a voltage threshold limiting the uppermost value of the useful voltage of the tachometric generator beyond the preset values.

4. A control device according to claim 1 further comprising a switching means having one contact connected to a terminal of said control voltage source and another contact connected to a tap of the feedback resistance through an auxiliary resistance whereby a point of re-reversal of decreasing voltage can be caused to approach an increasing-voltage reversal.

5. A control device according to claim 4 in which the decreasing voltage re-reversal may be rendered definitive in spite of considerable variations in the source voltage by actuation of said switch which is connected on one side through a diode to the emitter of the third transistor and through a resistance to a common point and on the other side through a low value resistance to the base of the first transistor, said diode being disposed in such a direction that said auxiliary resistance is inoperative as long as the control voltage exceeds a preset value but that below said value the low-value resistance restores a high positive feedback rate of the output towards the base of the first transistor.

6. A control device according to claim 5 in which said switch is closed at the end of the accelerator stroke in order to permit restoring a more reduced gear ratio at a speed higher than the normal adjustment value.

7. A control device according to claim 6 further comprising means permitting the selection of the gear ratios connected to said switch to avoid engaging a too greatly reduced ratio at high engine speed while permitting preserving said ratio immediately after gear engagement.

8. A control device according to claim 6 in which said switch closed at the end of the accelerator stroke is connected through a resistance to said voltage divider in order to reduce its resistance in the closed contact position for selectively reducing under these conditions the time constant of the circuit and increasing the speed at which the control action takes place.

References Cited

UNITED STATES PATENTS 3,124,693  3/1964  Peras.

A. HARRY LEVY, *Primary Examiner.*